United States Patent
Best, III (10) Patent No.: US 9,725,184 B2
(45) Date of Patent: Aug. 8, 2017

(54) METHODS FOR SEALING AN INTERNAL COMPOSITE VENT STRINGER

(71) Applicant: The Boeing Company, Chicago, IL (US)

(72) Inventor: Donald Joe Best, III, Arlington, WA (US)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 14/744,005

(22) Filed: Jun. 18, 2015

(65) Prior Publication Data
US 2016/0368617 A1    Dec. 22, 2016

(51) Int. Cl.
| | | |
|---|---|---|
| *B05D 7/22* | (2006.01) | |
| *B05D 1/40* | (2006.01) | |
| *B64D 37/32* | (2006.01) | |
| *B29C 65/00* | (2006.01) | |
| *B64C 3/18* | (2006.01) | |
| *B64C 3/26* | (2006.01) | |
| *B64F 5/00* | (2017.01) | |
| *B64F 5/40* | (2017.01) | |
| *B05D 3/12* | (2006.01) | |
| *B64F 5/45* | (2017.01) | |

(52) U.S. Cl.
CPC ............... *B64D 37/32* (2013.01); *B05D 1/40* (2013.01); *B05D 7/22* (2013.01); *B29C 65/00* (2013.01); *B64C 3/182* (2013.01); *B64C 3/26* (2013.01); *B64F 5/00* (2013.01); *B05D 3/12* (2013.01); *B64F 5/40* (2017.01); *B64F 5/45* (2017.01)

(58) Field of Classification Search
CPC   B64D 37/32; B64C 3/182; B64C 3/26; B64F 5/00; B64F 5/45; B64F 5/40; B05D 1/40; B05D 3/12; B05D 7/22; B29C 65/00

USPC .................................................. 427/230, 290
See application file for complete search history.

(56) References Cited

U.S. PATENT DOCUMENTS

| | | |
|---|---|---|
| 8,074,694 B2 | 12/2011 | Brook et al. |
| 9,010,689 B1 | 4/2015 | Brook et al. |
| 2012/0045609 A1 | 2/2012 | Brook et al. |
| 2012/0184185 A1* | 7/2012 | Kanazawa ............. B24C 1/045 451/38 |
| 2014/0284426 A1 | 9/2014 | Erickson et al. |

(Continued)

FOREIGN PATENT DOCUMENTS

| | | |
|---|---|---|
| EP | 2479109 A1 | 7/2012 |
| EP | 2502824 A2 | 9/2012 |

OTHER PUBLICATIONS

European Patent Office, Extended European Search Report regarding European Patent Application No. 16174939.5-1754, mailed Nov. 15, 2016, 6 pages.

*Primary Examiner* — Kirsten Jolley
(74) *Attorney, Agent, or Firm* — Kolisch Hartwell, P.C.

(57) ABSTRACT

A method of sealing an aircraft wing vent stringer may include placing a movable sealant sled in a vent stringer cavity of an aircraft wing. The sealant sled may include a sealant source configured to apply sealant to a wing portion within the vent stringer. The sealant sled may be transported through the cavity in a longitudinal direction defined by the wing, thereby applying a layer of sealant to the wing. In some cases, vent stringer may be abraded and/or washed before sealing. In some cases, two or more layers of sealant may be applied, one of which may be a secondary fuel barrier.

19 Claims, 6 Drawing Sheets

(56) References Cited

U.S. PATENT DOCUMENTS

2015/0343715 A1* 12/2015 Cruzado Parla ........ B29C 70/44
  264/571
2016/0009035 A1* 1/2016 Zarfos ..................... B32B 37/24
  219/634
2016/0176073 A1* 6/2016 Spexarth ................. B29C 35/02
  264/39

* cited by examiner

METHODS FOR SEALING AN INTERNAL COMPOSITE VENT STRINGER

INTRODUCTION

Composite structures are used in a wide variety of applications. In aircraft construction, composites are used in increasing quantities to form the fuselage, wings, tail section, and other components. For example, the wings may be constructed of composite skin members to which stiffening elements, such as stringers, may be coupled to increase the bending strength and stiffness of the skin member. The stringers may extend in a generally span wise direction along the wing, i.e. approximately from the wing root to the wing tip. The stringers may be bonded to the skin members.

The stringers in a wing may extend from an inboard section of the wing to an outboard section of the wing. The stringers may include purely structural stringers and also stringers that serve both a structural and a systemic purpose, such as vent stringers. Vent stringers may act as a conduit for venting fuel and fuel vapors from the inboard section of the wing fuel tanks to the surge tanks farther out in the wings. The vent stringers may carry fuel or fuel vapors during refueling or during flight operation of the aircraft, when pressure changes may require venting of the fuel aircraft tanks.

Care must be taken to seal vent stringers to avoid a spark or other ignition source from reaching an aircraft fuel tank through a stringer. For example, aircraft sometimes experience lightning strikes while in flight. Electrical current created by these strikes can travel along the wings. If an electrical spark were to travel through a vent stringer from the inner skin of the wing to another interior portion of the vent stringer it could cause catastrophic failure of the wing, particularly if the vent stringer is carrying fuel or fuel vapor at the time. Electrically insulating the interiors of vent stringers could protect the aircraft from such catastrophic failure.

SUMMARY

A method of sealing an aircraft wing vent stringer may include placing a movable sealant sled in a vent stringer cavity of an aircraft wing. The sealant sled may include a sealant source configured to apply sealant to a wing portion within the vent stringer. The sealant sled may be transported through the cavity in a longitudinal direction defined by the wing, thereby applying a layer of sealant to the wing.

Another method of electrically insulating a portion of an aircraft wing within a vent stringer may include attaching a wheeled abrasion tool to a pull line that extends along a long dimension of a hollow vent stringer interior. The abrasion tool may include an abrasive surface configured to press against a wing skin portion of the vent stringer interior. The abrasion tool may be pulled through the vent stringer from one end of the vent stringer to another end of the vent stringer with the pull line, thereby abrading material from an inner surface of the wing skin. After abrading material from the wing skin, a wheeled sealant tool may be attached to the pull line. The sealant tool may include a source of sealant configured to dispense sealant onto the internal wing skin. The sealant tool may then be pulled through the vent stringer from one end of the vent stringer to another end of the vent stringer with the pull line, thereby dispensing sealant onto the inner surface of the wing skin. The prior abrasion of the wing skin may promote better adhesion of the sealant.

Another method of electrically insulating a portion of an aircraft wing may include disposing a pull line within a hollow interior of an aircraft wing vent stringer. The pull line may extend from a root portion of the wing to a tip portion of the wing. An abrasion tool may be pulled through the vent stringer with the pull line, thereby abrading material from in inner surface of the wing. After abrading material from the wing, a sealant tool may be pulled through the vent stringer, thereby dispensing sealant onto the inner surface of the wing.

The present disclosure provides various apparatuses and methods of use thereof. Such apparatuses include an abrasion tool and a sealant tool. In some embodiments, a method may include abrading an inner surface of a vent stringer and applying a first layer of sealant to the abraded inner surface. In some embodiments, a method may include applying a second layer of sealant over the first layer. In some embodiments, the first layer may be a secondary fuel barrier.

Features, functions, and advantages may be achieved independently in various embodiments of the present disclosure, or may be combined in yet other embodiments, further details of which can be seen with reference to the following description and drawings.

DETAILED DESCRIPTION

Overview

Exemplary embodiments of an abrasion tool and a sealant tool configured to electrically insulate a portion of an aircraft wing, along with methods of such insulation, are described below and illustrated in the associated drawings. Unless otherwise specified, an abrasion tool, a sealant tool and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar abrasion and sealant tools. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Examples, Components, and Alternatives

The present disclosure generally relates to systems and methods for electrically insulating portions of an aircraft wing within a vent stringer. More specifically, the present teachings relate to systems and methods for abrading the inner surface of a composite aircraft wing within a vent stringer, applying a first sealant layer to the abraded area, and in some cases also applying a second sealant layer over the first sealant layer. In some cases the first sealant layer may be a secondary fuel barrier. The methods according to the present teachings may allow the inner surface of the wing within the vent stringer to be electrically insulated without having to disassemble the wing.

Figure 1:
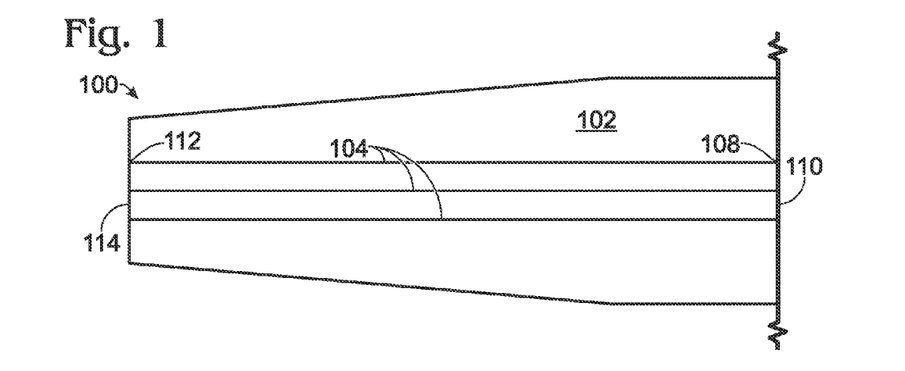
FIG. 1 is a schematic top view of an aircraft wing, including a set of vent stringers disposed within the wing.
Figure 2:
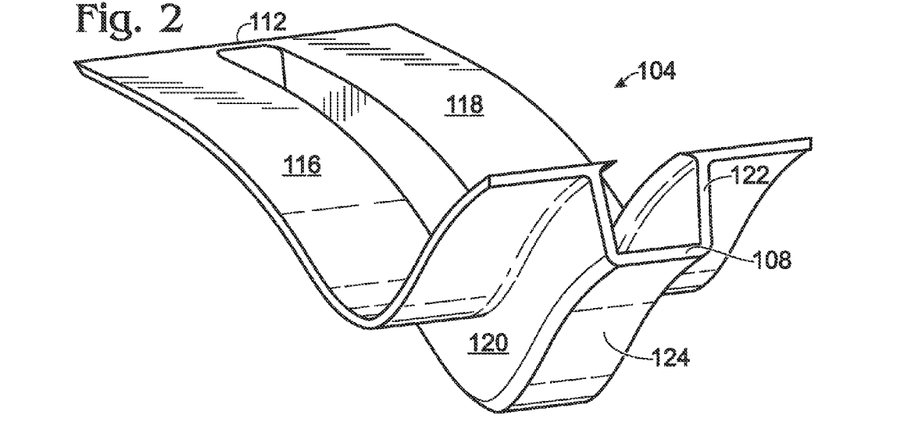
FIG. 2 is an isometric view of one embodiment of a vent stringer.
Figure 3:
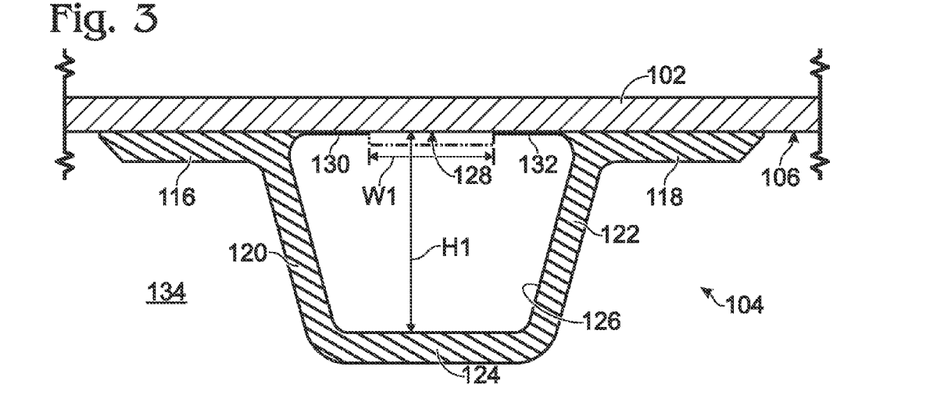
FIG. 3 is a cross-sectional view of the vent stringer of FIG. 2.

FIGS. 1-3 depict various aspects and embodiments of exemplary aircraft wing vent stringers. FIG. 1 is a schematic top view of an aircraft wing, generally indicated at 100. Portions of aircraft wing 100 may be made from composite materials, such as reinforced carbon fiber. Typically, composite materials include a matrix material (or bond material) such as resin (e.g. thermoset epoxy), and a reinforcement material, such as a plurality of fibers (e.g. a woven layer of carbon fibers). An upper surface or wing skin 102 of wing 100 may be formed from multiple layers of each of the matrix material and the reinforcement material.

One or a plurality of vent stringers 104 may be disposed within wing 100 and operatively coupled to an inner upper surface 106 of wing 100 (see FIG. 3). In the exemplary wing depicted in FIG. 1, three vent stringers are shown, but the number of vent stringers can vary. Each of the vent stringers 104 may extend in a longitudinal direction along the span of wing 100. That is, each vent stringer may have a first end 108 proximate an inboard end 110 or root of wing 100, where the inboard end of the wing is proximate the fuselage of the aircraft. Each vent stringer may also have a second end 112 proximate an outboard end 114 or tip of wing 100, where the outboard end of the wing is opposite the inboard end. Each vent stringer need not have the same longitudinal extent along wing 100.

FIG. 2 is an isometric view of a single vent stringer 104. For ease of viewing, a long dimension of the vent stringer from the first end 108 to the second end 112 has been greatly shortened in FIG. 2. Vent stringer 104 includes a first flange 116 configured to be coupled to the inner upper surface 106 of the wing and a second flange 118 configured to be coupled to the inner upper surface 106 of the wing. The vent stringer further includes a first web wall 120 and a second web wall 122, extending away from the first and second flanges, respectively. A cap 124 extends from the first web wall to the second web wall.

As depicted in the cross sectional view of FIG. 3, a vent stringer cavity 126 is defined by the inner upper surface 106 of the wing, the first web wall 120, the second web wall 122, and the cap 124 when the vent stringer has been coupled to the inner upper surface 106 of the wing.

As depicted in FIG. 2, vent stringer 104 may have some curvature along its length from the first end 108 to the second end 112, and the upper inner surface 106 of the wing to which the vent stringer is attached also may have some curvature from the inboard end to the outboard end. Typically, vent stringer 104 will have curvature that is complementary to the curvature of the wing. Thus, the first and second flanges 116 and 118 may be coupled to the inner surface of the wing along the entire length of the first and second flanges. Cap 124 may rise and fall along the length of the vent stringer in correspondence with the curvature of the wing. That is, cap 124 may be configured to maintain a substantially constant distance from the upper inner surface of the wing along the length of the vent stringer.

Turning now to FIG. 3, vent stringer 104 may be coupled to the upper surface 102 of the wing by any appropriate means. For example, rivets or bolts may be used to couple the first and second flanges 116 and 118 to the upper surface. In the case where both the vent stringer and the upper surface of the wing are made of composite materials, the vent stringer may be molecularly bonded to the upper surface of the wing through adhesion, for instance provided in a curing process. The first and second flanges 116 and 118 may be exterior to cavity 126. Vent stringer 104 may further include a first inner flange 130 and a second inner flange 132 configured to be coupled to the upper inner surface 106 of the wing. The first and second inner flanges may be interior to cavity 126.

Vent stringer 104 may have a substantially constant cross section along the long dimension between the first and second ends. For instance, a height H1 of cavity 126, defined by the shortest distance between the cap 124 and the portion 128 of the upper inner surface 106 within cavity 126, may be substantially constant along the length of the vent stringer. Similarly, a width W1 of the portion 128 of the upper inner surface 106 exposed within cavity 126 may be constant along the length of the vent stringer. Width W1 may be the distance between the first and second web walls or width W1 may be the distance between the first and second inner flanges 130 and 132.

Cavity 126 may carry fuel or fuel vapors, as vent stringer 104 may be operatively coupled to one or more aircraft fuel tanks. In some cases, some or all of vent stringer 104 may be disposed within a fuel tank 134. That is, if the interior space of vent stringer 104 is cavity 126, the exterior space outside of the vent stringer may be disposed within a fuel tank.

Figure 4:
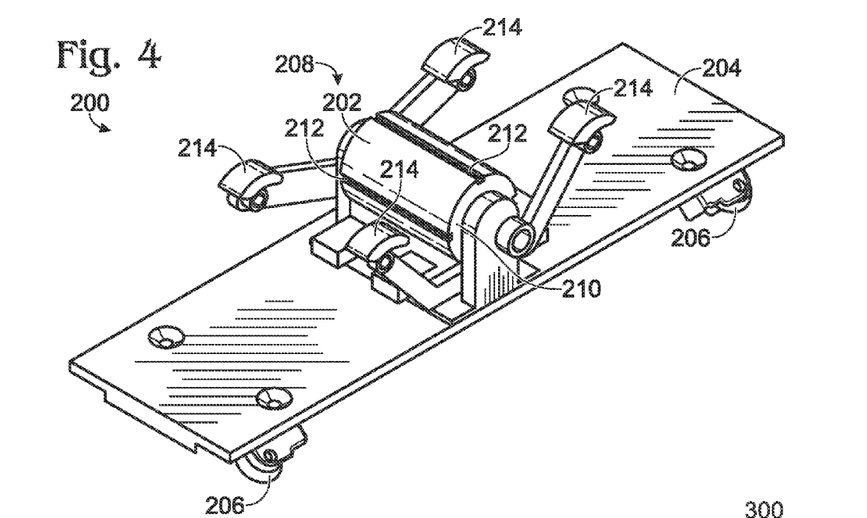
FIG. 4 is an isometric view of an exemplary embodiment of an abrasion tool, according to aspects of the present teachings.

FIG. 4 is an exemplary embodiment of an abrasion tool, which also may be referred to as an abrasive sled, generally indicated at 200. Abrasion tool 200 may be configured to fit within and travel along the length of vent stringer 104. Abrasive sled 200 includes an abrasive surface 202 configured to abrade a portion of a vent stringer, such as portion 128 of the upper inner surface 106 of wing 100 within vent stringer 104. There are many abrasion tool configurations capable of abrading the exposed portion of the wing within the vent stringer; abrasion tool 200 is just one example.

Abrasion tool 200 includes a base 204, a set of wheels 206, and an abrasion assembly generally indicated at 208. The set of wheels 206 are coupled to base 204 and configured to allow the abrasion tool to travel along vent stringer 104. In FIG. 4 the wheels are shown to be angled outward. This may allow the wheels to travel along the joints between the first and second web walls and cap 124, which may provide some lateral stability to the abrasion tool as it moves along the length of the vent stringer. Wheels 206 may alternately be pointed straight down and make contact only with cap 124.

Abrasion assembly 208 is coupled to base 204 and includes abrasive surface 202. Abrasive surface 202 is configured to abrade the exposed portion 128 of the upper inner surface 106 of wing 100. Abrading the upper inner surface of the wing may include removing material from upper inner surface of the wing. The amount of material removed may be, for example, less than 0.001 inches, though other amounts are also possible.

Abrasion assembly 208 may be configured so that abrasive surface 202 presses against the portion 128 of the upper inner surface of the wing within the vent stringer. Abrasive surface 202 may press against the upper inner surface of the wing at all locations along the vent stringer as the abrasion tool travels from one end of the vent stringer to the other. Abrasion assembly 208 may include a spring which is biased to maintain contact between the abrasive surface 202 and the upper inner surface of the wing.

Abrasive surface 202 may be disposed on a roller 210 within abrasion assembly 208. Abrasive surface 202 may be a roughened surface and/or may have a set of cutting edges 212. Abrasion assembly 208 may include a power source and a motor configured to rotate roller 210 in order to abrade surface 106. Abrasion assembly 208 may include a set of stabilizing arms 214 configured to maintain abrasive surface 202 in proper relation to inner upper surface 106.

Figure 5:
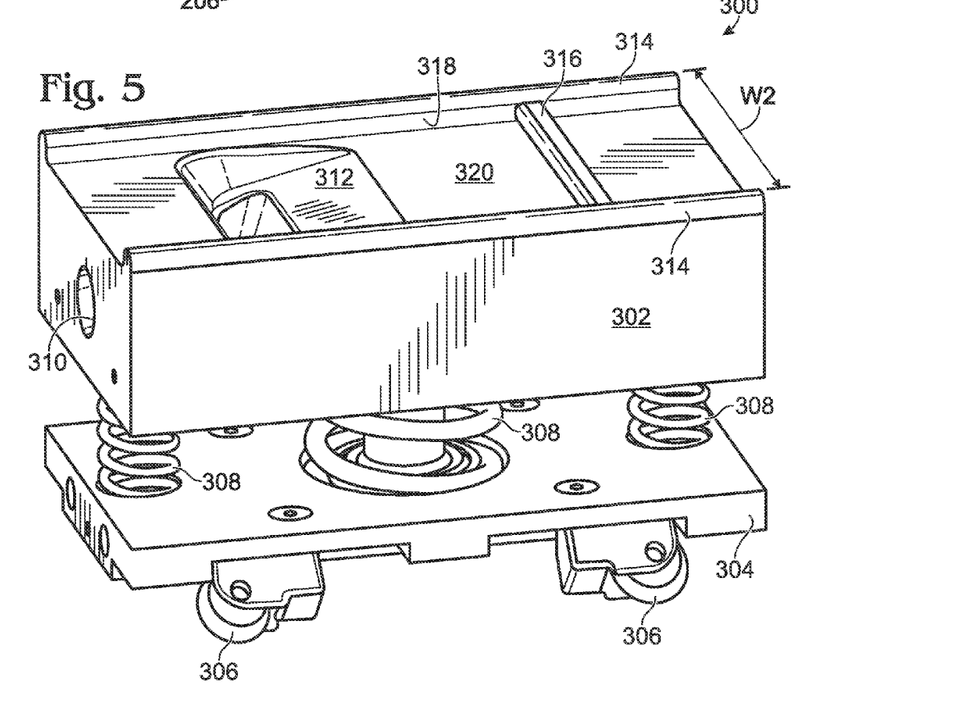
FIG. 5 is an isometric view of an exemplary embodiment of a sealant tool, according to aspects of the present teachings.

FIG. 5 is an exemplary embodiment of a sealant tool or sled, generally indicated at 300. Sealant tool 300 may be configured to apply a layer of sealant to the exposed portion 128 of the upper inner surface of the wing as sealant tool 300 travels along the length of a vent stringer. Sealant tool 300 includes an applicator 302 and a base 304.

Similar to base 204 of the abrasion tool, base 304 of the sealant tool 300 includes a set of wheels 306. Wheels 306 may allow sealant tool 300 to travel along the length of vent stringer 104. If the wheels are angled to the outside, as depicted in FIG. 5, the wheels may further provide lateral stability to sealant tool 300 by engaging with the first and second web walls 120 and 122 as well as cap 124 of the vent stringer. Alternately, wheels 306 may point straight down and engage with cap 124 only.

Base 304 of the sealant tool may be coupled to applicator 302 by one or more springs 308. Springs 308 may be configured to allow applicator 302 to maintain contact with the upper inner surface 106 of the wing as the sealant tool 300 travels along the vent stringer. In the case where one or more springs 308 are used to couple the applicator to the base, the applicator may maintain contact with the upper inner surface of the wing even when the upper inner surface has an amount of curvature. Springs 308 may allow applicator to maintain this contact even if the upper inner surface of the wing has a different amount of curvature than the cap along which base 304 is travelling. In the case where vent stringer 104 includes the first and second inner flanges 130 and 132 seen in FIG. 3, in some embodiments applicator 302 may maintain contact with the inner flanges instead of the upper inner surface 106 of the wing itself.

Sealant tool 300 may include an inlet port 310 capable of coupling to a sealant supply line. The sealant supply line may deliver a supply of sealant to applicator 302, which applicator 302 may apply to an upper surface of cavity 126. Inlet port 310 may be fluidically connected to a sealant outlet 312. Applicator 302 may include a set of rails 314 and a bar 316. When applicator 302 makes contact with the upper inner surface 106 of the wing, the contact may be along rails 314.

Fluid sealant may flow from the supply line into inlet port 310 and through the applicator to sealant outlet 312. As sealant exits the sealant outlet 312, the sealant may fill a space 318 between a top surface 320 of applicator 302, the upper inner surface 106 of the wing, rails 314, the sealant outlet 312, and bar 316. Sealant may thus be applied to the upper inner surface 106 of the wing between the rails 314. Rails 314 may be spaced apart by a width W2. The sealant may adhere to the upper inner surface of the wing when the sealant makes contact with the upper inner surface. The adherence of sealant to the upper inner surface of the wing may be aided by first abrading the upper inner surface of the wing, for example, using abrading tool 200.

Bar 316 may serve to even out the layer of sealant applied to the upper inner surface. Rails 314 may extend above bar 316. As the sealant tool 300 moves along the vent stringer (to the left in FIG. 5) sealant is fed to the tool by the sealant supply line, is applied to the upper inner surface of the wing in space 318, and is left on the upper inner surface as the sealant tool travels farther down the vent stringer. The travel speed of the sealant tool and the inflow rate of sealant to inlet port 310 may be configured so that the inflow rate, measured in volume of sealant per time, is the same as the flow rate of sealant exiting space 318 past bar 316. Bar 316 may be a straight flat bar as depicted in FIG. 5 or it may have any other appropriate shape. For example, bar 316 may have a V-shape, where the pointed end of the V is directed towards the sealant outlet 312. The difference in height between bar 316 and rails 314 may determine a thickness of the layer of sealant applied. In the case where vent stringer 104 includes first and second inner flanges 130 and 132, sealant may be applied to the first and second inner flanges as well as to the exposed portion 128 of the upper inner surface of the wing between the first and second inner flanges.

Figure 6:
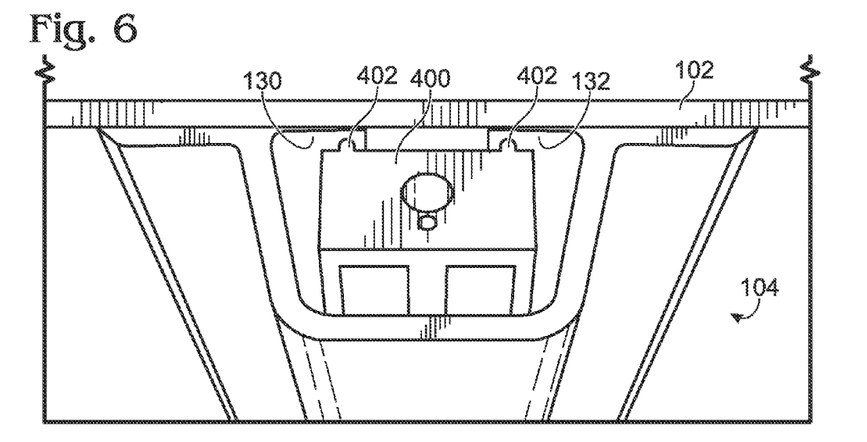
FIG. 6 is an isometric view of an exemplary embodiment of a sealant tool disposed within a vent stringer, according to aspects of the present teachings.

FIG. 6 is an isometric view of another exemplary embodiment of a sealant tool or sled 400 disposed within a vent stringer 104. Sealant tool 400 is configured to travel along vent stringer 104, applying sealant to the cavity as it travels. Sealant tool 400 also has a set of rails 402 configured to make contact with either the upper surface 102 of the wing or the first and second inner flanges 130 and 132 of the vent stringer. As sealant tool 400 travels along vent stringer 104, sealant may be applied to the upper surface of the wing between the rails 402.

Figure 7:
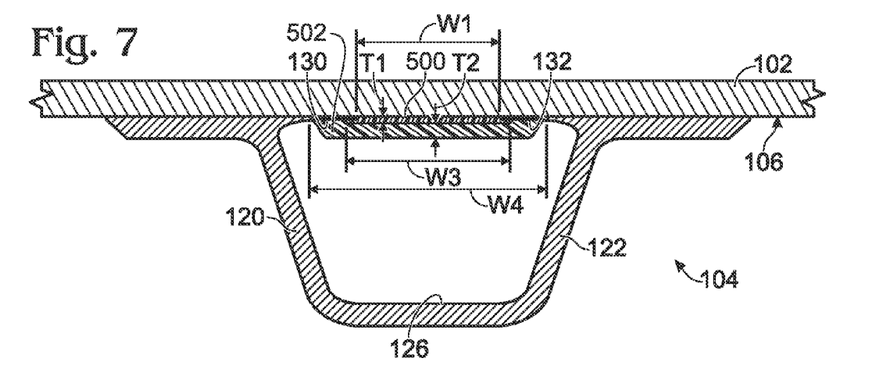
FIG. 7 is a cross-sectional view of a vent stringer, depicting a first layer of sealant and a second layer of sealant, according to aspects of the present teachings.

FIG. 7 is a schematic cross-sectional view of vent stringer 104, showing a first layer 500 of sealant and a second layer 502 of sealant applied to upper inner surface 106 of wing 100.

More specifically, the first layer 500 of sealant may be an electrically insulating layer or a secondary fuel barrier applied to the upper inner surface 106 of the upper surface 102 of a wing. An electrically insulating layer may prevent or substantially reduce the risk of sparks within the vent stringer cavity. A secondary fuel barrier may substantially reduce or eliminate the amount of fuel that could penetrate the upper inner surface of the wing. First layer 500 may be applied to the exposed portion 128 of the upper inner surface between the first and second web walls 120 and 122. If vent stringer 104 includes first and second inner flanges 130 and 132, seen clearly in FIG. 3, then first layer 500 may also be applied to the first and second inner flanges. First layer 500 may have a width W3 that is wider than W1, the width of the exposed portion 128 of the upper inner surface within the cavity 126 of vent stringer 104. That is, first layer 500 may cover the entire length of the exposed portion 128 and some or all of the first and second inner flanges 130 and 132.

First layer 500 may, for example, have a thickness T1 within a range of 0.010 to 0.100 inches. If first layer 500 is applied via a sealant tool such as sealant tool 300, the thickness T1 may be determined by the difference in height of the rails 314 and the bar 316 above the top surface 320 of applicator 302. The width W3 of first layer 500 may be determined by the width W2 between the rails 314. Width W3 may be substantially the same as width W2. First layer 500 may be created by one or more than one passes of a sealant tool such as sealant tool 300.

Second layer 502 may be another electrically insulating layer. Second layer 502 may substantially cover first layer 500. That is, second layer 502 may be disposed over first layer 500 and may have a width W4 that is greater than the width W3 of the first layer. The second layer 502 may then be disposed over the first layer 500 as well as the upper inner surface 106 of the wing or the first and second inner flanges 130 and 132 if vent stringer 104 includes the inner flanges.

Second layer 502 may be applied to the upper surface of cavity 126 by an apparatus similar to sealant tool 300. If such a device is used to create second layer 502, the width between the rails may be larger than the width W3 of the first layer 500.

In the case where second layer 502 is an electrically insulating layer, the second layer may, for example, have a thickness in a range of 0.050 to 0.100 inches. A total sealant thickness of the first and second layers combined may, for example, be around 0.150 inches. In the case where first layer 500 is a secondary fuel barrier, the first layer may have a thickness in a range of 0.02 to 0.030 inches. Second layer 502 may be created by one or more than one pass of a sealant tool similar to sealant tool 300.

Figure 8A:
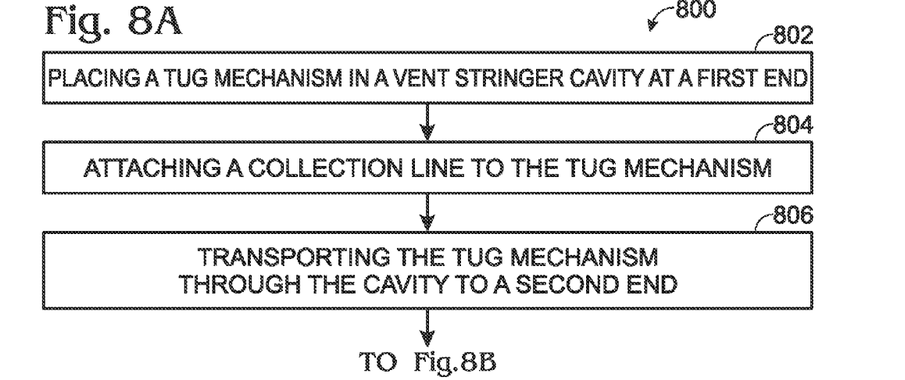
FIGS. 8A and 8B together are a flow chart depicting a method of sealing an aircraft wing vent stringer, according to aspects of the present teachings.
Figure 8B:
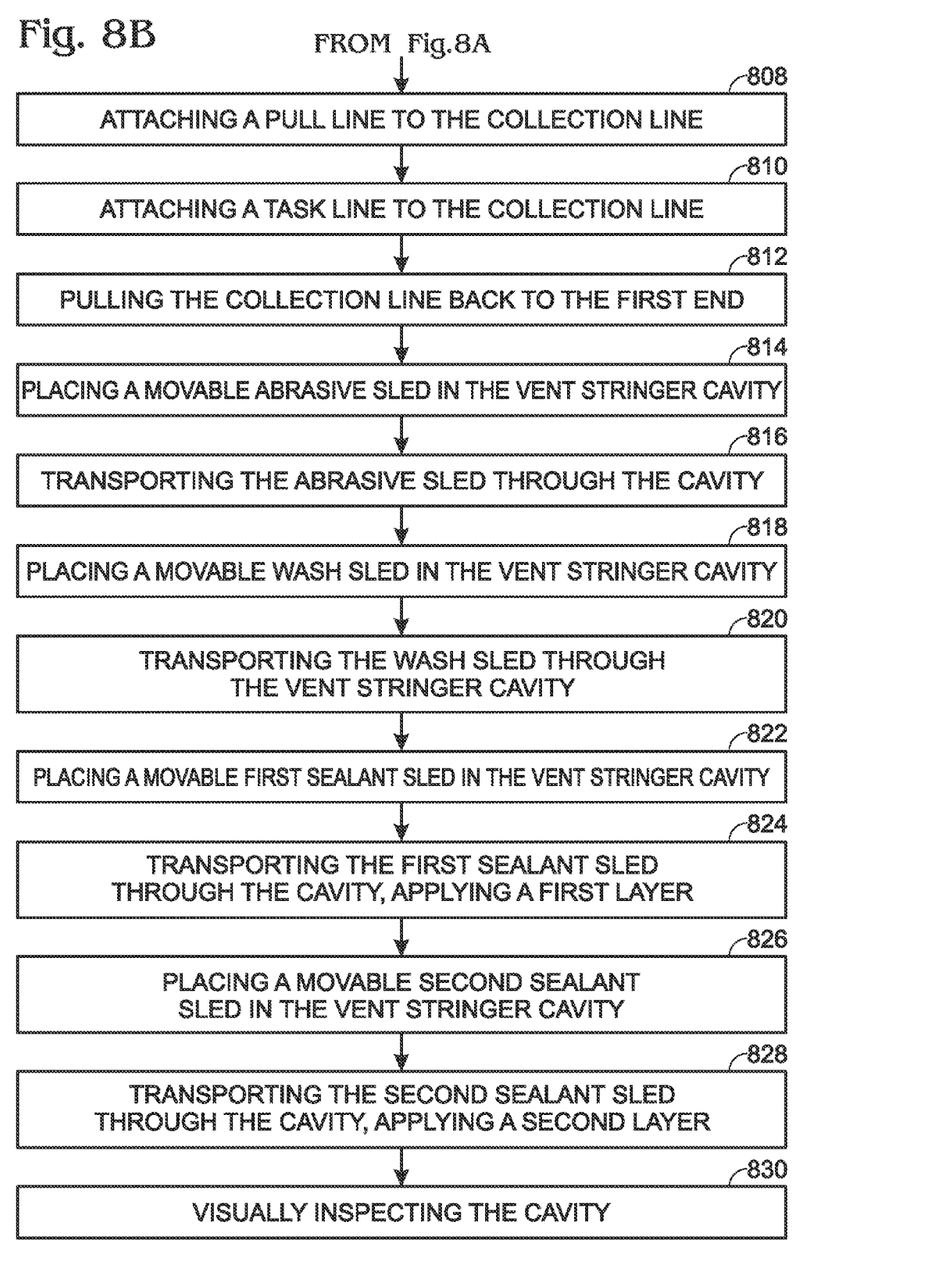

FIGS. 8A and 8B depict multiple steps of a method, generally indicated at 800, of sealing an aircraft wing vent stringer. Method 800 may be performed in conjunction with apparatuses for sealing an aircraft vent stringer described in the present disclosure, such as those depicted in FIGS. 4-6. Method 800 also may be performed with other suitable apparatuses. Although various steps of method 800 are described below and depicted in FIGS. 8A and 8B, the steps need not necessarily all be performed, and in some cases may be performed in a different order than the order shown.

Prior to performing method 800, various preparation steps may be performed on the aircraft wing and the vent stringer. For example, if the aircraft has been in service, the aircraft may be grounded, taken out of service, and defueled. The wing may then be cleaned.

To prepare the wing, access panels on the bottom of the wing may be removed, thus granting a user access to portions of the vent stringer coupled to the inner upper surface of the wing. Various systems may need to be removed in order to gain the necessary access to the vent stringer. For example, vent stringer flanges, access panels, and end covers may need to be removed to gain the necessary access to the vent stringer.

To prepare the vent stringer, certain brackets may be removed. The vent stringer may include a set of vent stringer dams disposed within the vent stringer cavity at discrete locations along the vent stringer. During operation, these vent stringer dams direct fuel and fuel vapors from the fuel tanks to the vent stringer and direct fuel and fuel vapors within the vent stringer. These dams might block the path of the various tools and devices used in method 800 along the vent stringer and would therefore likely be removed.

Once the vent stringer dams have been removed there may be small gaps or holes in the floor of the vent stringer cavity where the dams once were. These gaps may be covered by wheel covers configured to allow the various tools and devices of method 800 to pass over the gaps without getting stuck. The wheel covers may be added and removed as needed throughout the performance of method 800. The gaps may also be utilized as attachment points for a wet vacuum system configured to remove any fluids introduced into the vent stringer cavity during a washing step of method 800.

At step 802, a tug mechanism or tug is placed in a vent stringer cavity at a first end of the cavity. The tug mechanism is configured to travel within the vent stringer cavity along the length of the vent stringer cavity. The vent stringer cavity may be open at the first end to accommodate the placement and removal of the tug mechanism and other tools. The tug mechanism may have an internal power source that provides the energy necessary to travel along the vent stringer, or the tug may be connected to a power line that delivers power to the tug from outside the cavity. The tug mechanism is capable of transporting itself and one or more lines attached to the tug along the length of the cavity.

At step 804, a collection line is attached to the tug mechanism. The collection line may be any line, cord, or link capable of retrieving a tool from the opposite end of the cavity by pulling on the collection line. The collection line may be attached or coupled to the tug mechanism by any appropriate means. The collection line will typically be at least as long as the vent stringer cavity in which the tug mechanism has been placed.

At step 806, the tug mechanism is transported through the cavity to a second end. That is, the tug mechanism is transported through the cavity in the longitudinal direction until the tug mechanism reaches a second end of the cavity. As mentioned in reference to step 802, the tug mechanism may move under its own power or may be powered by a connection to a power line that extends outside the cavity.

As the tug mechanism is transported to the second end of the cavity, so too will the collection line which has been attached to the tug be transported to the second end of the cavity. Once the tug reaches the second end of the cavity the collection line will be disposed within the cavity along the entire length of the vent stringer cavity. The longitudinal direction of the cavity may be taken to the direction within the cavity that corresponds to the largest physical dimension of the cavity. For example, referring to vent stringer 104 in FIG. 1, the longitudinal direction would be the direction from the first end of the vent stringer 108 to the second end of the vent stringer 112. The second end of the vent stringer cavity may be open to accommodate the placement and removal of the tug mechanism and other tools.

At step 808, a pull line is attached to the collection line. The pull line may be any line, cord, or link capable of retrieving a tool from the opposite end of the cavity by pulling on the pull line. The pull line is also typically at least as long as the vent stringer cavity. The pull line may be attached to the collection line while the collection line is located at the second end of the cavity. The connection between the pull line and the collection line may be made at or near the second end of the cavity. The pull line may be coupled to the collection line by any appropriate means.

At step 810, a task line is attached to the collection line. The task line may be configured to deliver a resource to a tool disposed within the cavity. For example, if an abrasive sled or tool is disposed within the cavity and the abrasive sled requires a source of compressed air, the task line could deliver compressed air to the abrasive sled. If a tool requires a source of power, the task line could deliver electrical energy to the tool. If a sealant sled or tool is disposed within the cavity and the sealant sled requires a source of liquid sealant, the task line may be a sealant line configured to transport sealant from a sealant supply reservoir to the sealant sled. If a wash sled or tool is disposed within the cavity and the wash sled requires pressurized water, the task line could deliver a source of pressurized fluid to the wash sled.

The task line may be attached to the collection line while the collection line is located at the second end of the cavity and while the collection line is disposed within the cavity. The task line may be coupled to the collection line by any appropriate means. The task line will typically be at least as long as the vent stringer cavity.

At step 812, the collection line is pulled back to the first end. By pulling the collection line back to the first end of the cavity, the pull line is thereby transported to the first end of the cavity. Further, if a task line has been attached to the collection line, pulling the collection line back to the first end of the cavity may include transporting the task line to the first end of the cavity. Once the collection line has been pulled back to the first end of the cavity, the pull line and/or the task line will be disposed within the cavity along the entire length of the cavity.

The collection line may be pulled by hand or by a powered pulling mechanism. The pulling mechanism may be configured to cease pulling when the pull line and/or the task line reach the first end of the cavity.

After the tug mechanism is transported to the second end of the cavity at step 806, the tug may be detached from the collection line and removed from the second end of the cavity. In an alternate version of steps 808, 810 and 812, the tug mechanism may remain in the cavity after step 806. The pull line and/or the task line may then be attached to the tug mechanism instead of the collection line. The collection line may then pull the tug mechanism back to the first end of the cavity, thus carrying the pull line and/or the task line along with the tug mechanism. The tug mechanism may then be removed from the first end of the cavity.

At step 814, a movable abrasive sled is placed in the vent stringer cavity. The movable abrasive sled is configured to fit within the vent stringer cavity and be movable along the length of the vent stringer cavity. As in step 802, the vent stringer cavity may be open at one or both ends to accommodate the placement and removal of the abrasive sled.

The abrasive sled may include an abrasive surface configured to abrade the wing portion within the vent stringer. The abrasive surface may be part of a roller configured to make contact with the wing and simultaneously rotate when the abrasive sled is disposed within the vent stringer cavity. An example of such an abrasive sled is abrasion tool 200 depicted in FIG. 4. In another example, the abrasive surface may be a top surface of the abrasive sled and be configured to make contact with the wing when the abrasive sled is disposed within the cavity, and further configured to be stationary with respect to the abrasive sled. Alternately, the abrasive sled may abrade the wing portion within the vent stringer by sandblasting the wing. That is, the abrasive sled may direct a high velocity stream of air and abrasive particles at the wing portion, thereby abrading the wing.

At the first end of the cavity, the abrasive sled may be coupled to one or more of the following: the pull line, the collection line, a power line, and a task line.

At step 816, the abrasive sled is transported through the cavity. The abrasive sled is transported through the cavity in the longitudinal direction. As the abrasive sled is transported through the cavity and the abrasive surface makes contact with the wing portion within the vent stringer cavity, the wing will thereby be abraded. In the case where the abrasive surface is the surface of a roller configured to rotate as it makes contact with the wing, the wing will be abraded by the rotating abrasive surface as the abrasive sled travels through the cavity.

The abrasive sled may be transported through the cavity by a variety of mechanisms. For instance, the abrasive sled may be coupled to the pull line and then pulled by the pull line through the cavity. The pull line may be pulled by hand or by a powered pulling mechanism. The pulling mechanism may be configured to stop pulling the abrasive sled when the abrasive sled reaches an end of the vent stringer cavity. The abrasive sled may also travel under its own power. Alternately, the abrasive sled may travel under power provided by a power source external to the vent stringer cavity through a power line connected to the abrasive sled.

Prior to transporting the abrasive sled through the cavity, the collection line may be coupled to the abrasive sled. Then as the abrasive sled travels from one end of the cavity to the other end, the collection line will again be disposed within the cavity along the entire length of the cavity. The collection line could then be used to retrieve one or more of the abrasive sled, the pull line, and a task line, for example a pressurized water line, to the first end of the cavity.

The abrasive sled may have a set of wheels configured to ease transport of the abrasive sled through cavity. The abrasive sled may also be configured to slide along the floor of the cavity as the sled is pulled. The abrasive sled may include a set of treads that allow the sled to travel like a tank.

At step 818, a movable wash sled is placed in the vent stringer cavity. The movable wash sled is configured to fit within the vent stringer cavity and be movable along the length of the vent stringer cavity. As in step 802, the vent stringer cavity may be open at one or both ends to accommodate the placement and removal of the wash sled. The wash sled may be coupled to one or more of the following: the pull line, the collection line, and a task line.

The wash sled may include a water source configured to wash the wing portion within the vent stringer. The water source may be a task line or water line that carries pressurized water to the wash sled from a reservoir external to the vent stringer. Many different configurations of a wash sled are possible, such as wheeled sleds, sliding sleds or tracked sleds fitted with a fluid inlet and one or more fluid outlets such as nozzles or high pressure fittings of various other known types.

At step 820, the wash sled is transported through the vent stringer cavity. By transporting the wash sled through the vent stringer cavity, the wing is thereby washed. For example, the wash sled may direct a stream of pressurized water towards the wing portion within the vent stringer. As the wash sled travels along the length of the cavity the cavity may be cleaned of any undesired material, such as the residue of the wing removed by the abrasive sled in step 816.

The wash sled may be transported through the vent stringer cavity by pulling on the pull line coupled to the wash sled. The pull line may be pulled by hand or by a powered pulling mechanism. The pulling mechanism may be configured to stop pulling the wash sled when the wash sled reaches an end of the vent stringer cavity.

Prior to transporting the wash sled through the vent stringer cavity, the wheel covers on the vent stringer dam access holes may be removed and replaced with aqueous covers. The aqueous covers may be configured to allow the wash sled to pass over the dam access holes without getting stuck and further configured to be coupled to a wet vacuum system. The vacuum system may remove any fluid or water introduced into the cavity by the wash sled, as well as any material that was removed from the inner surface of the cavity by the wash sled. The vacuum system may be operated concurrently with the transporting of the wash sled.

Once the wash sled reaches the other end of the cavity, the wash sled may be removed from the cavity. In this case the pull line and a task line, for example a sealant tube or secondary fuel barrier tube, may be coupled to the collection line and returned to the first end of the cavity by pulling on the collection line. Alternately, the pull line and task line may be coupled to the wash sled and the wash sled, pull line, and task line returned to the first end of the cavity by pulling on the collection line. The wash sled may then be removed from the first end of the cavity.

At step 822, a movable first sealant sled is placed in the vent stringer cavity of an aircraft wing. The movable first sealant sled is configured to fit within the vent stringer cavity and to be movable along the length of the vent stringer cavity. As in step 802, the vent stringer cavity may be open at one or both ends to accommodate the placement and removal of the first sealant sled.

The first sealant sled includes a sealant source configured to apply sealant to the wing portion within the vent stringer. An example of a first sealant sled is sealant tool 300 depicted in FIG. 5. In this example the sealant source may be the applicator 302 which is configured to apply a layer of sealant to the upper surface of the vent stringer cavity, including the wing portion within the vent stringer. The first sealant sled may receive the sealant from a task line, such as a sealant tube, that delivers sealant to the sled from a sealant reservoir outside the cavity. The first sealant sled may further be coupled to the pull line and/or the collection line.

At step 824, the first sealant sled is transported through the cavity, applying a first layer of sealant within the cavity. The first sealant sled may be transported through the cavity in the longitudinal direction defined by the wing, thereby applying a first layer of sealant to the wing. The first sealant sled may be transported by coupling the pull line to the first sealant sled and pulling on the pull line. The pull line may be pulled by hand or by a powered pulling mechanism. The pulling mechanism may be configured to stop pulling the first sealant sled when the first sealant sled reaches an end of the vent stringer cavity. The first sealant sled may also travel under its own power, much as did the tug mechanism. Alternately the first sealant sled may travel under its own power while connected to a power source external to the vent stringer cavity by a power line.

As the first sealant sled is transported through the cavity, the first sealant sled may dispense sealant onto the upper surface of the cavity. For example, a first sealant sled, such as sealant tool 300 depicted in FIG. 5, may be configured to apply a first layer of sealant, such as first layer 500 depicted in FIG. 7. The first layer of sealant may be a secondary fuel barrier. To dispense the secondary fuel barrier, the second sealant sled may be coupled to a task line carrying a supply of the secondary fuel barrier.

As the first sealant sled travels from one end of the cavity to the other end, the collection line will again be disposed within the cavity along the entire length of the cavity. The collection line could then be used to retrieve one or more of the first sealant sled, the pull line, and a task line, for example a sealant tube, to the first end of the cavity.

At step 826, a movable second sealant sled is placed in the vent stringer cavity. The movable second sealant sled is configured to fit within the vent stringer cavity and be movable along the length of the vent stringer cavity. As in step 802, the vent stringer cavity may be open at one or both ends to accommodate the placement and removal of the second sealant sled. An example of such a second sealant sled is a sled generally similar to sealant tool 300 described in reference to FIG. 5, but configured so that the width W2 between the rails is wider than the width W1 of the previously deposited first layer. The second sealant sled may include a sealant source configured to apply sealant over the wing portion within the vent stringer. Alternatively, in some embodiments the width between rails of the first sealant sled may be adjustable, thus avoiding the need for two separate sealant sleds.

The sealant applied by the second sealant sled may be of the same composition as the first layer. Alternately, the first sealant sled may include a fuel barrier source configured to apply a fuel barrier layer over the wing portion within the vent stringer, and the second sealant sled may be configured to apply an electrically insulating sealant layer over the previously applied fuel barrier layer. The sealant applied by the first sealant sled may be a secondary fuel barrier. The vent stringer cavity may carry fuel or fuel vapors and the secondary fuel barrier may be configured to prevent or substantially reduce the amount of fuel that penetrates the wing.

At step 828, the second sealant sled is transported through the cavity, applying a second layer of sealant. The second layer of sealant may be of the same or a different composition as the first layer. The second layer of sealant may be disposed on top of the first layer of sealant. The second sealant sled may be configured to apply a wider layer of sealant than the first layer.

As the second sealant sled travels from one end of the cavity to the other end, the collection line will again be disposed within the cavity along the entire length of the cavity. The collection line could then be used to retrieve one or more of the second sealant sled, the pull line, and an imaging device to the first end of the cavity.

At step 830, the cavity is visually inspected. The cavity may be visually inspected by transporting an imaging device, such as a camera, through the cavity. The imaging device may be transported through the cavity by any appropriate means. For example, an imaging device may be coupled to a sled and pulled from one end of the cavity to the other by either the pull line or the collection line. The imaging device may be configured to take images of the inside of the cavity or a movie of the inside of the cavity as it is transported. The imaging device may store the collected images in a memory or it may transmit the images to a user, either wirelessly or via a line coupled to the imaging device and extending out of the cavity. The imaging device may include a light source as the inside of a vent stringer cavity may be dark. An appropriate imaging device would be familiar to a person skilled in the art.

Figure 9A:
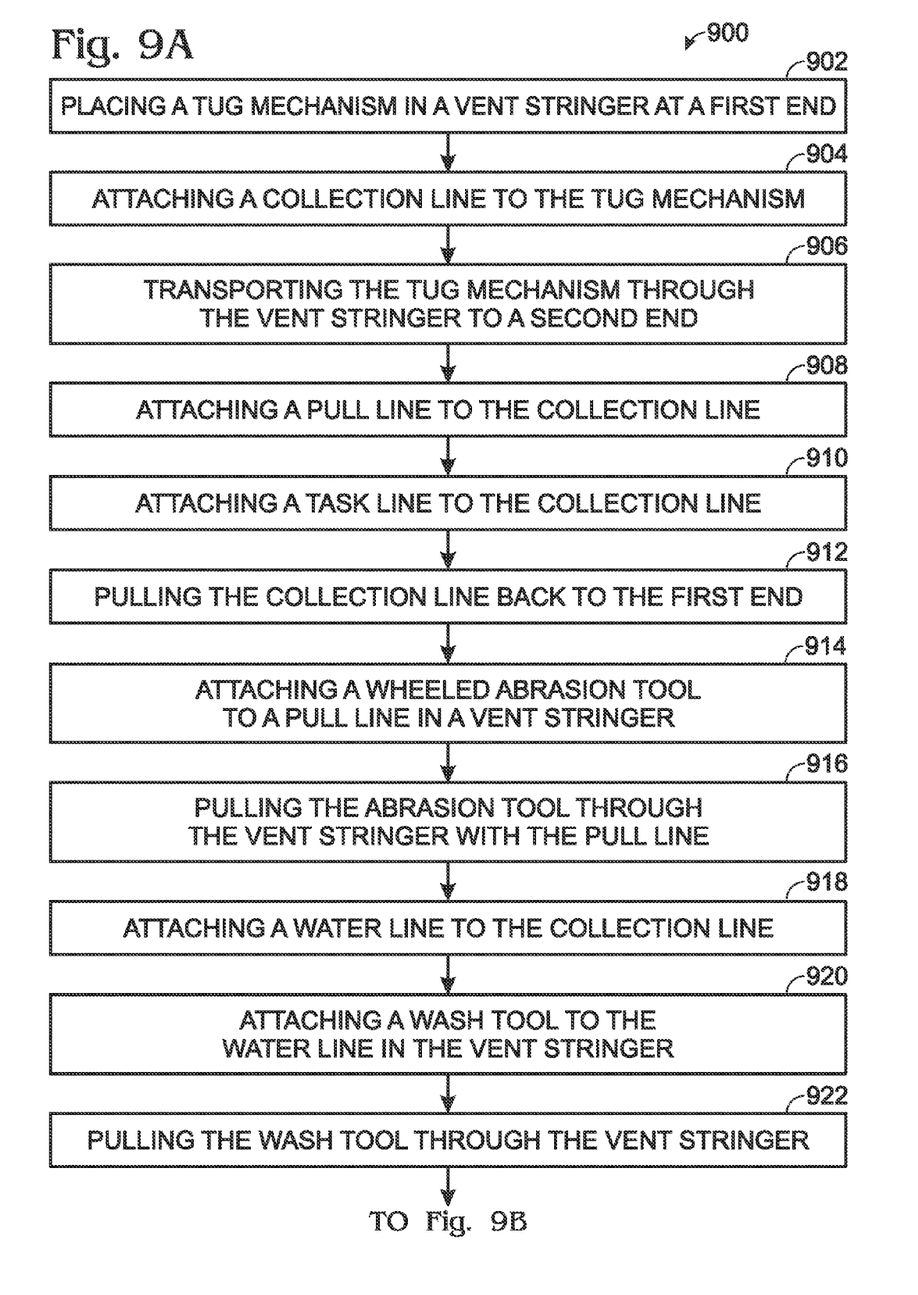
FIGS. 9A and 9B together are a flow chart depicting a method of electrically insulating a portion of an aircraft wing within a vent stringer, according to aspects of the present teachings.
Figure 9B:
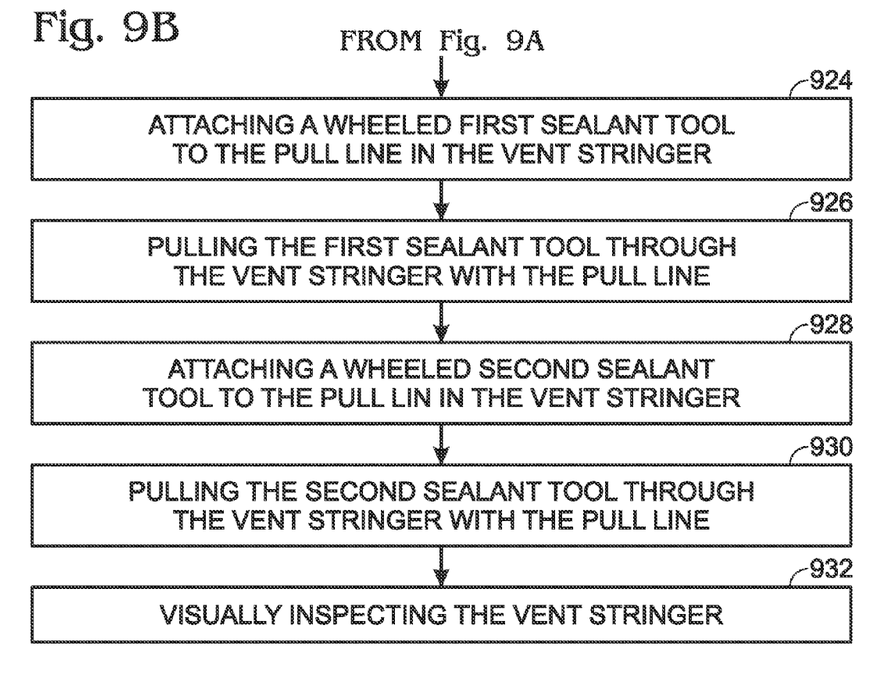

FIGS. 9A and 9B depict multiple steps of a method, generally indicated at 900, of insulating a portion of an aircraft wing within a vent stringer. Method 900 may be performed in conjunction with apparatuses for sealing an aircraft vent stringer described in the present disclosure, or with any other apparatus suitable to be transported through a vent stringer and to carry out the appropriate steps of method 900. Although various steps of method 900 are described below and depicted in FIGS. 9A and 9B, the steps need not necessarily all be performed, and in some cases may be performed in a different order than the order shown.

Prior to performing method 900, various preparation steps may be performed on the aircraft wing and the vent stringer. These preparation steps may be substantially identical to the preparation steps described in reference to method 800.

At step 902, a tug mechanism is placed in the vent stringer at a first end of the vent stringer. Step 902 may be identical or substantially identical to step 802 of method 800.

At step 904, a collection line is attached to the tug mechanism. Step 904 may be identical or substantially identical to step 804 of method 800.

At step 906, the tug mechanism is transported through the vent stringer from the first end of the vent stringer to a second end of the vent stringer. Step 906 may be identical or substantially identical to step 806 of method 800.

At step 908, the pull line is attached to the collection line. The pull line may be attached to the collection line while the collection line is located at the second end of the vent stringer. Step 908 may be identical or substantially identical to step 808 of method 800.

At step 910, a task line is attached to the collection line. The task line may be attached to the collection line while the collection line is located at the second end of the vent stringer. Pulling the collection line back to the first end of the vent stringer includes pulling the task line to the first end of the vent stringer. The task line may be a sealant line configured to transport sealant form a sealant supply reservoir to the first sealant tool. Step 910 may be identical or substantially identical to step 810 of method 800.

At step 912, the collection line is pulled back to the first end of the vent stringer. The pull line may thereby be extended along the long dimension of the hollow vent stringer. Step 912 may be identical or substantially identical to step 812 of method 800.

At step 914, a wheeled abrasion tool is attached to the pull line in the vent stringer. The pull line extends along a long dimension of the hollow vent stringer interior. The abrasion tool may include an abrasive surface configured to press against a wing skin portion of the vent stringer interior. An example of such a wheeled abrasion tool is abrasion tool 200 described in reference to FIG. 4. Step 914 may be identical or substantially identical to step 814 of method 800.

At step 916, the abrasion tool is pulled through the vent stringer with the pull line. The abrasion tool may be pulled through the vent stringer from one end of the vent stringer to another end of the vent stringer with the pull line, thereby abrading material from an inner surface of the wing skin. Step 916 may be identical or substantially identical to step 816 of method 800.

At step 918, a water line is attached to the collection line. The water line may be connected to the collection line while the collection line is located at the second end of the vent stringer. Pulling the collection line back to the first end of the vent stringer may include pulling the water line to the first end of the vent stringer. The water line may be configured to deliver pressurized water to a tool within the vent stringer from a reservoir located outside the vent stringer.

At step 920, a wash tool is attached to the water line in the vent stringer. The wash tool is configured to wash the wing skin portion of the vent stringer interior. Step 920 may be identical or substantially identical to step 818 of method 800.

At step 922, the wash tool is pulled through the vent stringer. As the wash tool is pulled through the vent stringer, the wash tool will wash the wing and/or the wing skin portion of the vent stringer interior. Step 922 may be identical or substantially identical to step 820 of method 800.

At step 924, a wheeled first sealant tool is attached to the pull line in the vent stringer. The first sealant tool may include a source of sealant configured to dispense sealant onto the wing skin. An example of such a first sealant tool is sealant tool 300 described in reference to FIG. 5. Step 924 may be identical or substantially identical to step 822 of method 800.

At step 926, the first sealant tool is pulled through the vent stringer with the pull line. The sealant tool may be pulled through the vent stringer from one end of the vent stringer to another end of the vent stringer with the pull line. As it is pulled the first sealant tool may dispense sealant or a first layer of sealant onto the inner surface of the wing skin. Step 926 may be identical or substantially identical to step 824 of method 800.

At step 928, a wheeled second sealant tool is attached to the pull line in the vent stringer. The second sealant tool may include a source of sealant configured to dispense sealant over the wing skin. An example of such a second sealant tool is sealant tool 300 described in reference to FIG. 5, where the width W2 of rails 314 is configured to be wider than the width W3 of the first layer of sealant applied to the wing skin, see FIG. 7. The second sealant tool may dispense sealant of substantially the same composition as the sealant dispensed by the first sealant tool, or it may dispense a different sealant than the first sealant tool. For example, the first sealant tool may dispense a secondary fuel barrier and the second sealant tool may dispense a layer of electrically insulating sealant. Step 928 may be identical or substantially identical to step 826 of method 800.

At step 930, the second sealant tool is pulled through the vent stringer with the pull line. The second sealant tool may be pulled through the vent stringer from one end of the vent stringer to another end of the vent stringer. While being pulled through the vent stringer the second sealant tool may apply a second layer of sealant on top of the sealant on the inner surface of the wing skin. Step 930 may be identical or substantially identical to step 828 of method 800.

At step 932, the vent stringer is visually inspected. The vent stringer interior may be visually inspected by attaching an imaging device to either of the collection line or the pull line and pulling the imaging device through the vent stringer. Step 932 may be identical or substantially identical to step 830 of method 800.

Figure 10:
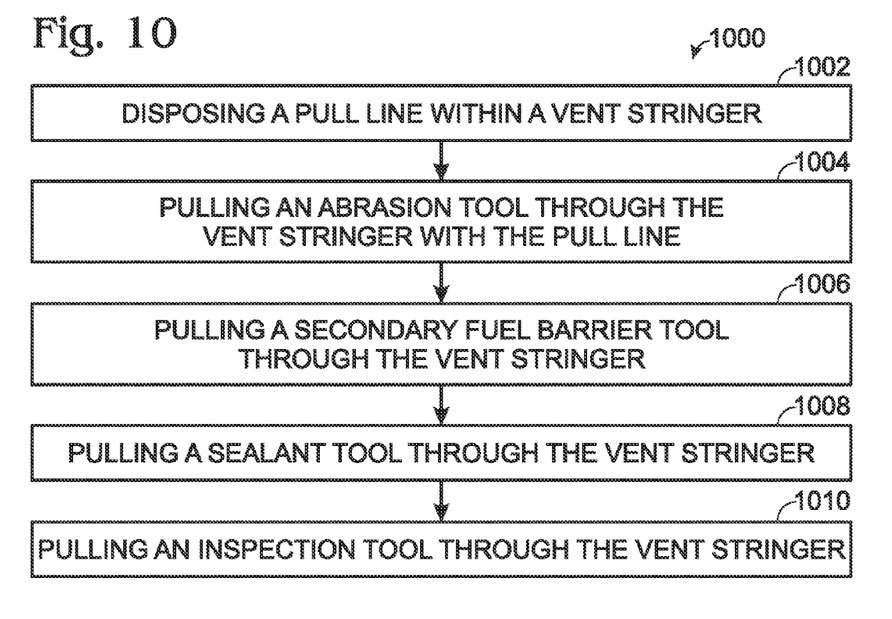
FIG. 10 is a flow chart depicting another method of electrically insulating a portion of an aircraft wing, according to aspects of the present teachings.

FIG. 10 depicts multiple steps of another method, generally indicated at 1000, of electrically insulating a portion of an aircraft wing. Method 1000 may be performed in conjunction with apparatuses for sealing an aircraft wing vent stringer described in the present disclosure, or using any other suitable equipment or apparatus configured to carry out one or more steps of the method. Although various steps of method 1000 are described below and depicted in FIG. 10, the steps need not necessarily all be performed, and in some cases may be performed in a different order than the order shown.

Prior to performing method 1000, various preparation steps may be performed on the aircraft wing and the vent stringer. These preparation steps may be substantially identical to the preparation steps described in reference to method 800.

At step 1002, a pull line is disposed within a vent stringer. The pull line may be disposed with the hollow interior of an aircraft wing vent stringer. The pull line may extend from a root portion of the wing to a tip portion of the wing. The root portion of the wing may be the inboard end 110 of the wing and the tip portion of the wing may be the outboard end of the wing, as depicted in FIG. 1. The hollow interior of the aircraft wing vent stringer may be cavity 126 depicted in FIG. 3. Disposing the pull line within and long the length of the hollow interior of the vent stringer may include several steps. For example, steps 802 through 812 of method 800 may be used to dispose a pull line within a vent stringer.

At step 1004, an abrasion tool is pulled through the vent stringer with the pull line. Pulling the abrasion tool through the vent stringer will thereby abrade material from an inner surface of the wing. An exemplary abrasion tool is abrasion tool 200 described in reference to FIG. 4. Step 1004 may be identical or substantially identical to step 816 of method 800.

At step 1006, a secondary fuel barrier tool is pulled through the vent stringer. As the secondary fuel barrier tool is pulled through, the secondary fuel barrier tool will dispense secondary fuel barrier onto the inner surface of the wing. An exemplary secondary fuel barrier tool is sealant tool 300 described in reference to FIG. 5, where the sealant tool is configured to dispense a secondary fuel barrier. The secondary fuel barrier dispensed from the sealant tool may form the first layer 500 described in reference to FIG. 7. Step 1006 may be identical or substantially identical to step 824 of method 800.

At step 1008, a sealant tool is pulled through the vent stringer. The sealant tool will dispense a sealant layer over the inner surface of the wing as the sealant tool is pulled. An exemplary sealant tool is sealant tool 300 described in reference to FIG. 5. The sealant layer may form second layer 502 described in reference to FIG. 7. Step 1008 may be identical or substantially identical to step 828 of method 800.

At step 1010, an inspection tool is pulled through the vent stringer. The inspection tool may be an imaging device, for example a camera or a movie camera. Step 1010 may be identical or substantially identical to step 830 of method 800.

Advantages, Features, Benefits

The different embodiments of methods for insulating a portion of an aircraft wing within a vent stringer described herein provide several advantages over known solutions for insulating the interior of a vent stringer. For example, the illustrative embodiments of methods described herein allow the vent stringer to be insulated, which may reduce the risk of sparking within the vent stringer during a lightning strike. Additionally, the illustrative methods described herein allow a secondary fuel barrier to be applied to the vent stringer, reducing unwanted penetration of fuel into and/or out of the vent stringer. The illustrative methods described herein are particularly useful for insulating or sealing the vent stringer without disassembling the wing, a significant improvement over previous methods. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A method of sealing an aircraft wing vent stringer, comprising:
   placing a movable first sealant sled in a vent stringer cavity of an aircraft wing, the first sealant sled including a sealant source configured to apply sealant to a wing portion within the vent stringer;
   transporting the first sealant sled through the cavity in a longitudinal direction defined by the wing, thereby applying a first layer of sealant to the wing; and
   prior to applying the first layer of sealant to the wing:
   placing a movable abrasive sled in the vent stringer cavity, the abrasive sled including an abrasive surface configured to abrade the wing portion within the vent stringer; and
   transporting the abrasive sled through the cavity in the longitudinal direction and thereby abrading the wing.

2. The method of claim 1, further comprising, after abrading the wing and prior to applying the first layer of sealant to the wing:
   placing a movable wash sled in the vent stringer cavity, the wash sled including a water source configured to wash the wing portion within the vent stringer; and
   transporting the wash sled through the vent stringer cavity and thereby washing the wing.

3. A method of sealing an aircraft wing vent stringer, comprising:
   placing a movable first sealant sled in a vent stringer cavity of an aircraft wing, the first sealant sled including a sealant source configured to apply sealant to a wing portion within the vent stringer;
   transporting the first sealant sled through the cavity in a longitudinal direction defined by the wing, thereby applying a first layer of sealant to the wing; and
   after applying the first layer of sealant to the wing:
   placing a movable second sealant sled in the vent stringer cavity, the second sealant sled including a sealant source configured to apply sealant over the wing portion within the vent stringer; and
   transporting the second sealant sled through the cavity in the longitudinal direction, thereby applying a second layer of sealant on top of the first layer of sealant.

4. The method of claim 3, wherein the first layer of sealant is a secondary fuel barrier and the second layer of sealant is an electrically insulating sealant.

5. A method of sealing an aircraft wing vent stringer, comprising:
   placing a movable first sealant sled in a vent stringer cavity of an aircraft wing, the first sealant sled including a sealant source configured to apply sealant to a wing portion within the vent stringer;

transporting the first sealant sled through the cavity in a longitudinal direction defined by the wing, thereby applying a first layer of sealant to the wing; and before transporting the first sealant sled through the cavity:
- placing a tug mechanism in the vent stringer cavity at a first end of the cavity;
- attaching a collection line to the tug mechanism;
- transporting the tug mechanism through the cavity in the longitudinal direction until the tug mechanism reaches a second end of the cavity;
- while the collection line is located at the second end of the cavity, attaching a pull line to the collection line; and
- pulling the collection line back to the first end of the cavity, thereby transporting the pull line to the first end of the cavity.

6. The method of claim 5, further comprising attaching a task line to the collection line while the collection line is located at the second end of the cavity, and wherein pulling the collection line back to the first end of the cavity includes transporting the task line to the first end of the cavity.

7. The method of claim 6, wherein the task line is a sealant line configured to transport sealant from a sealant supply reservoir to the first sealant sled.

8. A method of sealing an aircraft wing vent stringer, comprising:
- placing a movable first sealant sled in a vent stringer cavity of an aircraft wing, the first sealant sled including a sealant source configured to apply sealant to a wing portion within the vent stringer;
- transporting the first sealant sled through the cavity in a longitudinal direction defined by the wing, thereby applying a first layer of sealant to the wing; and
- visually inspecting the cavity by transporting an imaging device through the cavity.

9. A method of electrically insulating a portion of an aircraft wing within a vent stringer, comprising:
- attaching a wheeled abrasion tool to a pull line that extends along a long dimension of a hollow vent stringer interior, the abrasion tool including an abrasive surface configured to press against a wing skin portion of the vent stringer interior;
- pulling the abrasion tool through the vent stringer from one end of the vent stringer to another end of the vent stringer with the pull line, thereby abrading material from an inner surface of the wing skin;
- after abrading material from the wing skin, attaching a wheeled first sealant tool to the pull line, the first sealant tool including a source of sealant configured to dispense sealant onto the wing skin; and
- pulling the first sealant tool through the vent stringer from one end of the vent stringer to another end of the vent stringer with the pull line, thereby dispensing sealant onto the inner surface of the wing skin.

10. The method of claim 9, further comprising, before attaching the wheeled abrasion tool to the pull line:
- placing a tug mechanism in the vent stringer at a first end of the vent stringer;
- attaching a collection line to the tug mechanism;
- transporting the tug mechanism through the vent stringer from the first end of the vent stringer to a second end of the vent stringer;
- while the collection line is located at the second end of the vent stringer, attaching the pull line to the collection line; and
- pulling the collection line back to the first end of the vent stringer, thereby extending the pull line along the long dimension of the hollow vent stringer.

11. The method of claim 10, further comprising attaching a task line to the collection line while the collection line is located at the second end of the vent stringer, and wherein pulling the collection line back to the first end of the vent stringer includes pulling the task line to the first end of the vent stringer.

12. The method of claim 11, wherein the task line is a sealant line configured to transport sealant from a sealant supply reservoir to the first sealant tool.

13. The method of claim 10, further comprising attaching a water line to the collection line while collection line is located at the second end of the vent stringer, and wherein pulling the collection line back to the first end of the vent stringer includes pulling the water line to the first end of the vent stringer.

14. The method of claim 13, further comprising, after pulling the abrasion tool through the vent stringer and prior to pulling the first sealant tool through the vent stringer,
- attaching a wash tool to the water line, the wash tool configured to wash the wing skin portion of the vent stringer interior; and
- pulling the wash tool through the vent stringer, thereby washing the wing.

15. The method of claim 10, further comprising visually inspecting the vent stringer interior by attaching an imaging device to either of the collection line or the pull line and pulling the imaging device through the vent stringer.

16. The method of claim 9, further comprising, after pulling the first sealant tool through the vent stringer,
- attaching a wheeled second sealant tool to the pull line, the second sealant tool including a source of sealant configured to dispense sealant over the wing skin; and
- pulling the second sealant tool through the vent stringer from one end of the vent stringer to another end of the vent stringer with the pull line, thereby applying a second layer of sealant on top of the sealant on the inner surface of the wing skin.

17. A method of electrically insulating a portion of an aircraft wing, comprising:
- disposing a pull line within a hollow interior of an aircraft wing vent stringer, extending from a root portion of the wing to a tip portion of the wing;
- pulling an abrasion tool through the vent stringer with the pull line, thereby abrading material from an inner surface of the wing;
- after abrading material from the wing, pulling a secondary fuel barrier tool through the vent stringer, thereby dispensing a secondary fuel barrier onto the inner surface of the wing.

18. The method of claim 17, further comprising pulling a sealant tool through the vent stringer, thereby dispensing a sealant layer over the inner surface of the wing.

19. The method of claim 17, further comprising pulling an inspection tool through the vent stringer, thereby capturing inspection images of the inner surface of the wing.

* * * * *